2,928,778
PURIFICATION OF WATER

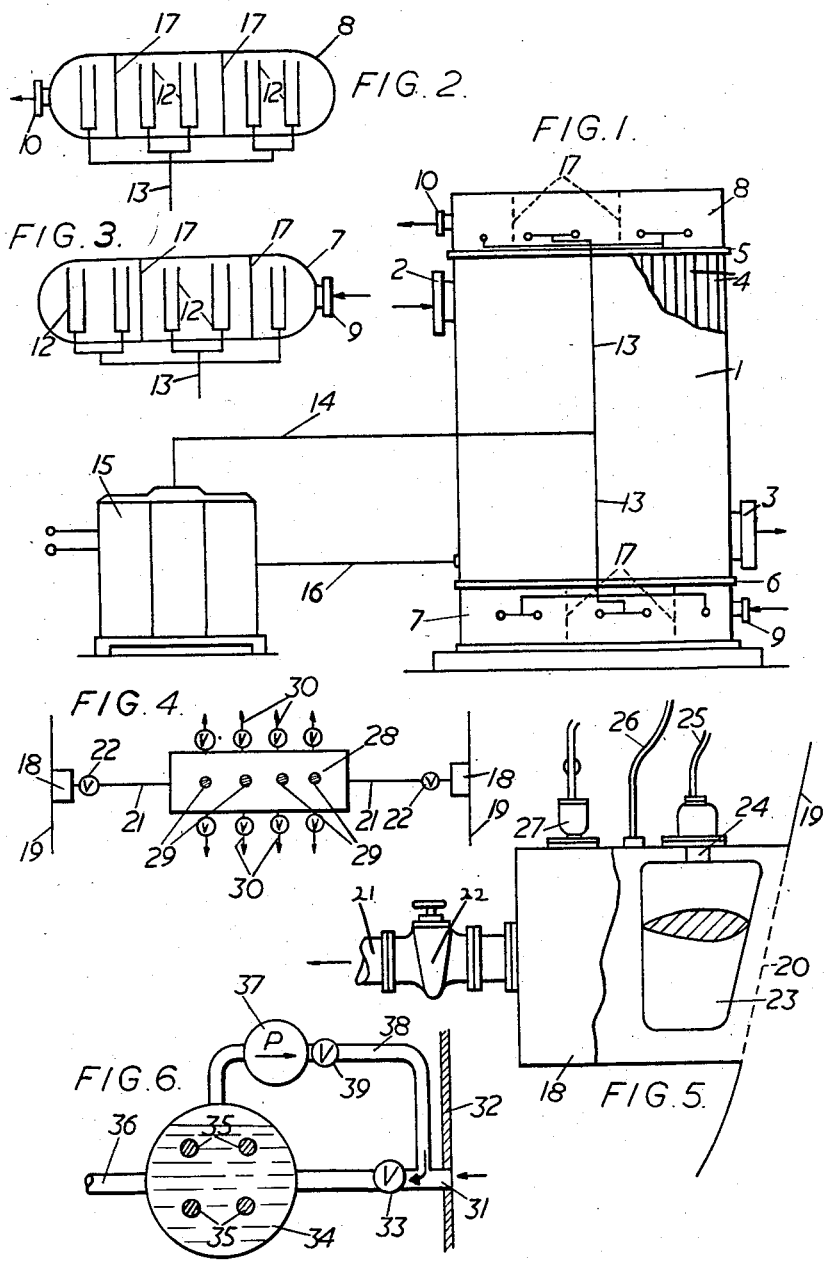

Patrick Ernest Heathfield Heathfield, Woldingham, Henry Guthrie Gow, Dore, and Arthur William Richardson, Kensington, London, England, assignors to Frank Lewis Chappell, Victoria, British Columbia, Canada Application August 7, 1957, Serial No. 676,881

Claims priority, application Great Britain August 21, 1956

10 Claims. (Cl. 204—149)

This invention relates to the purification of water by means of electrolysis, and likewise to the protection of metal plant in which the water is used, the method involving the passage of an electric current through the water.

The usual supplies of water, fresh or salt, available in large quantities for cooling plant such as the gas condensers in gas works and coke oven installations, and for industrial and marine installations, whether power plant or otherwise, contain algae, bacteriological slime, and animal growths such as mussels and other shellfish, as well as salts tending to produce scale formation and corrosion. Whether the water is used once only or is circulated repeatedly, as from a pond, algae and other growths rapidly accumulate, the temperature conditions in the plant often being such as to encourage growth, and this reduces the efficiency of the plant by lowering the rate of heat transfer and even by interfering with the flow of the water.

By causing the water to flow past an anode immersed in the stream, the electrolytic action overcomes scale formation by reason of dissolved salts, and the corrosion that frequently accompanies scaling. Although iron may be used as the anode to reduce scale formation, aluminum is more commonly used. Neither of these metals, is, however, very efficacious in attacking algae and like growths. If mussels and like animal growths, in salt water or fresh, are not attacked, it can readily arise that water freed by electrolysis from the harmful effects of dissolved salts may carry such growths to beyond the location of the anode, there to secure a lodging in favourable conditions for natural growth, even to the point of completely blocking the system.

Where the water contains chlorides, a carbon anode may be used, and the liberated chlorine attacks such growths, but carbon anodes are only suitable where the flow of water to be treated is small.

Copper anodes have been used to prevent scale formation and corrosion, but they have certain disadvantages, although it has been proposed to use both copper and aluminum anodes simultaneously to secure complete protection. The use of copper anodes puts copper salts into the water, which eventually dissociate, thus diberating free copper, which has the disadvantage of setting up galvanic action with ferrous materials in the cooling plant, and pitting of such materials is liable to occur. Moreover, the dissipated copper cannot always be kept under control, and may escape with the treated water beyond the influence of the electrolysing current, to set up corrosion in plant elsewhere. Copper appears to have only a limited effect on algae and slimes, and even less on mussels and other shellfish.

The object of the invention is to secure the benefits of the electric current method of purifying water liable to algae and slimes and animal growths of the kind indicated, and also to reduce scale formation and corrosion, without the disadvantages attendant on the use of copper for the anodes.

According to the present invention, a method of purifying water comprises passing an electric current through the water by means of an anode of aluminium and/or iron containing arsensic and/or antimony, so as to combine the benefits of electrolytic action for reduction of scale formation and corrosion by salts dissolved in the water with the toxic action on algae and slimes and mussels and like animal growths of the arsenic ions and/or antimony ions liberated as a result of electrolytic action.

The invention also includes the simultaneous use of aluminum and iron anodes each containing one or other or both of the toxic additions. The simultaneous additional use with anodes containing a toxic addition of aluminium and iron anodes not containing any such addition is also included.

As the metal of the anode containing arsenic and/or antimony gradually dissipates due to electrolysis, so do the ions of the toxic material migrate to the cathode via the water, destroying or inhibiting the growth of algae and bacteriological slimes, and mussels and the like in their field of influence.

Desirably, the addition of toxic material should be ½% upwards on the weight of the anode material. A range of ½% to 3% by weight is particularly effective for arsenic in aluminum anodes. In the case of antimony, ⅓% to 10% may be used for aluminum anodes. For iron anodes, ½% to 2% of arsenic or ½% to 6% of antimony may be used. Aluminum anodes may also contain say ½% to 2% arsenic together with ½% to 6% antimony, and iron anodes may likewise contain say ½% to 2% arsenic together with ½% to 4% antimony.

Where aluminum containing the toxic addition is used as the anode, the aluminum itself disperses as hydroxide, which does not bring about the disadvantageous galvanic action resulting from the use of copper. Iron anodes containing the toxic addition are likewise free from this disadvantage.

In general, only one kind of anode, aluminum or iron, containing one only of the toxic materials, arsenic and antimony, is required in any installation, and this keeps the purifying installation at its simplest, both as to construction and as to operation. In the examples now to be described with reference to the accompanying drawings, the anodes will be described as all consisting of arsenical aluminium; but, from what has already been said, it must be understood that the invention is not limited to the use of arsenical aluminium as the material of the anodes.

In the drawings:

Figure 1 is a diagrammatic view of a gas condenser fitted for electrolytic treatment of the cooling water;

Figures 2 and 3 are diagrammatic sections of the top and bottom water compartments of Figure 1, showing the anodes;

Figure 4 is a diagrammatic plan of a marine system fitted for prevention of marine growth;

Figure 5 is a diagrammatic vertical section of one of the intakes of Figure 4; and Figure 6 is a diagrammatic section of another form of marine system.

In Figures 1 to 3, gas enters the body of a gas condenser 1 by an inlet 2 and leaves by an outlet 3 after flowing across the outside of tubes 4 extending between tube plats 5, 6 and connecting a bottom water compartment 7 to a top water compartment 8. Water enters the bottom compartment 7 by an inlet 9, flows through the tubes 4, and leaves the top compartment by an outlet 10.

The compartments 7, 8, contain a plurality of anodes 12 of arsenical aluminium, of U-shape, lying horizontally and connected by leads 13 to a positive lead 14 from a rectifier and controller 15, which is connected by a negative lead 16 to the shell of the condenser 1. The anodes 12 are preferably identical in size and shape; and, by their similar connection to the same source of electric current, all lose metal at substantially the same rate, and thus become due for replacement at the same time, this facilitating the design of the anodes for them to remain operative for a stipulated period, say one year. Thus, the U-shaped anodes may be formed from an arsenical aluminium bar of say 2½" x ¾" section, each anode being supported near the bend of the U by, but suitably insulated from, the side of its compartment 7 or 8.

By means of baffles 17 in the compartments 7, 8, the raw water entering at 9 is constrained to pass up and down different sets of the tubes 4, and at the beginning and end of each passage to pass one or more of the anodes 12, so that it is effectively subjected to electrolytic action, which both prevents the formation of scale inside the tubes 4 and other parts of the condenser 1 contacted by the water, and also attacks algae and slime and any mussels or the like that would otherwise tend to block the plant, particularly the tubes 4.

The use of aluminium containing the toxic addition for the complete duty of preventing scale formation and corrosion and attacking growths has the further important advantage that for many purposes the same duty for a stipulated period may be performed with a weight of aluminium that is very much cheaper than the weight of copper that would have to be used, the weights required depending not only on the free surface of anode to be provided, as provided by the extended U-shape of Figures 2 and 3, but also on the need for the metal remaining toward the end of the period to be robust enough for service, i.e., the U-shaped anodes 12 should not collapse until the time has arrived for all of them to be replaced.

In Figures 4 and 5, a sea-chest 18 is fitted to a ship's side 19 and water enters the chest through an intake grill 20. Water required for the ship's services is drawn into and through the chest 18 by a suction pipe 21 fitted with a main valve 22, and is forced to pass an anode 23 of arsenical aluminium supported through insulation 24 from the top of the chest and connected to a positive lead 25 to a supply of electrolysing current, a negative lead 26 being connected to the chest, which forms the cathode. The chest is fitted with an automatic air valve 27.

Not only is all water drawn into the pipe 21 subjected to electrolytic treatment by having to pass the anode 23 and also of the toxic effect of the arsenic ions slowly liberated from the anode, but the effect extends to the area occupied by the grill 20 so that it is kept clear of growths, particularly of mussels and the like that rapidly block the intake where the water is untreated, even to the extent of filling a pipe such as the pipe 21. Moreover, the subjection of the water to the toxic effect of the arsenic ions ensures that mussels and the like do not pass into any compartments fed by the pipe 21, as occurs when the water is subjected to mere electrolytic action by the use of ordinary metal anodes for the prevention scale.

As shown in Figure 5, two sea chests 18 as in Figure 4, fitted with anodes for the protection of the intake grills 20 and the main suction valves 22 and pipes 21 are connected by the pipes 21 to a cross-tank 28 for bulk storage, which contains further anodes 29 of arsenical aluminium, suspended so as to subject the water to a second electrolytic and toxic treatment before it leaves by pipes 30 to the various ship's services. The intakes as shown in Figures 4 and 5 are more particularly suitable for installation in new ships.

In Figure 6, which shows an installation suitable for application to an intake already existing in a ship comprising a plain pipe 31 opening direct from the ship's side 32 and connected through a main suction valve 33 with a longitudinal storage tank 34. The tank 34 is provided with longitudinal anodes 35 of arsenical aluminium, so that all water is subjected to electrolytic and toxic treatment before leaving by a pipe 36 to the ship's services. However, it is still necessary to protect the pipe 31 and the valve 33 from blockage, and for this purpose treated water is circulated from the tank 33 by a pump 37 through a shut off valve 39 and a pipe 38 that joins the pipe 31 near to the ship's side.

The arsenical aluminium anodes may be used to protect stationary metal installations covered by water likely to produce scale and corrosion and growths, particularly in sea water, where the rise and fall of the tides alternately covers and bares the metal. Thus, the metal columns of piers, or metal fire-protecting walls used with piers on wooden columns, may be protected by appropriately disposed anodes. The arsenic ions in the electrolysing field surrounding an anode effectively prevents scale and growths on the metal, and yet tests have shown that the arsenic content of the water immediately outside this field is not measurably different from the natural arsenic content of sea water, i.e., 0.002 part per million. The use of the invention in such locations does not therefore introduce any hazard by the slow liberation of these arsenic ions; and the same applies where fresh water is returned after treatment to the stream or river from which it was originally drawn.

The current used in the supply to the anodes varies in accordance with the size of the installation, generally between 10 and 40 amperes, and the voltage will largely depend on the conductivity of the water, say between 5 and 30 volts, sea water requiring a lower voltage than fresh water.

What we claim is:

1. A method of purifying the water in sea water systems for the control of bacteria and infestations of mussels and shell fish consisting of passing a direct electric current through the water by means of an alloy anode consisting essentially of aluminum and about 3% by weight of arsenic.

2. A method of purifying water consisting of passing a direct electric current through the water by means of an alloy anode consisting essentially of aluminum, and containing antimony in the range ½% to 10% by weight.

3. A method of purifying water consisting of passing a direct electric current through the water by means of an alloy anode consisting essentially of aluminum, and containing arsenic in the range ½% to 2% and antimony in the range ½% to 6%, all by weight.

4. A method of purifying water consisting of passing a direct electric current through the water by means of an alloy anode consisting essentially of iron, and containing arsenic in the range ½ to 2% by weight.

5. A method of purifying water consisting of passing a direct electric current through the water by means of an alloy anode consisting essentially of iron, and containing antimony in the range ½% to 6% by weight.

6. A method of purifying water consisting of passing a direct electric current through the water by means of an alloy anode consisting essentially of iron, and containing arsenic in the range ½% to 2% and antimony in the range ½% to 4%, all by weight.

7. An anode for use in the electrolytic purification of water in sea water systems for the control of bacteria and infestations of mussels and shell fish, said anode consisting of an alloy of a metal in the group consisting of aluminum and iron and ½% to 3% by weight of at least one substance in the group consisting of arsenic and antimony.

8. An anode for use in the electrolytic purification of water, said anode consisting of binary aluminum alloy containing ½% to 10% of antimony by weight.

9. An anode for use in the electrolytic purification of water, said anode consisting of binary iron alloy containing ½% to 2% of arsenic by weight.

10. An anode for use in the electrolytic purification of water, said anode consisting of binary iron alloy containing ½% to 6% of antimony by weight.

References Cited in the file of this patent

UNITED STATES PATENTS

| | | |
|---|---|---|
| 1,034,711 | Ives | Aug. 6, 1912 |
| 1,340,437 | Deeter | May 18, 1920 |
| 2,321,796 | Butler | June 15, 1943 |

FOREIGN PATENTS

| | | |
|---|---|---|
| 498,766 | Great Britain | Jan. 13, 1939 |